United States Patent [19]

Shin

[11] Patent Number: 5,942,821

[45] Date of Patent: Aug. 24, 1999

[54] ELECTRIC MOTOR HAVING A ROTOR SUPPORTED BY A HOLDER MEMBER WHICH IS ANGULARLY FIXED TO A PRINTED CIRCUIT BOARD

[75] Inventor: Seong Ho Shin, Kyunggi-Do, Rep. of Korea

[73] Assignee: Samsung Electro-Mechanics Co. Ltd., Suwon, Rep. of Korea

[21] Appl. No.: 08/943,713

[22] Filed: Oct. 3, 1997

[30] Foreign Application Priority Data

Nov. 19, 1996 [KR] Rep. of Korea ............... 96-40657

[51] Int. Cl.⁶ ................................................ H02K 1/18
[52] U.S. Cl. ................... 310/67 R; 310/DIG. 6; 310/91; 310/90
[58] Field of Search ................ 310/DIG. 6, 67 R, 310/90, 91, 254; 360/99.07, 99.08, 99.03

[56] References Cited

U.S. PATENT DOCUMENTS

| | | | |
|---|---|---|---|
| 4,259,603 | 3/1981 | Uchiyama et al. | 310/68 B |
| 5,093,599 | 3/1992 | Horng | 310/254 |
| 5,173,628 | 12/1992 | Yoshida et al. | 310/71 |
| 5,578,883 | 11/1996 | Sakashita et al. | 310/91 |

FOREIGN PATENT DOCUMENTS 8-186969  7/1996  Japan .................. 310/DIG. 6

*Primary Examiner*—Nestor Ramirez
*Assistant Examiner*—K. Imayoshi Tamai
*Attorney, Agent, or Firm*—Ladas & Parry

[57] ABSTRACT

A holder member fixing apparatus of a motor facilitates the fixing of a holder member without requiring a separate jig by fixing the holder member to the upper portion of a substrate via a printed circuit board and forming a position setting hole for previously setting the fixing position of the holder member into the printed circuit board. The apparatus includes a holder member which is inserted with a rotating shaft in the center thereof and is formed with a backing stand for placing a rotor thereon to the lower portion of the outer periphery thereof, and a substrate having a plurality of couplers to the upper portion thereof to be fixedly coupled by being inserted with a plurality of brackets radially-formed along the outer periphery of the backing stand. Also, a printed circuit board fixedly installed to the upper portion of the substrate while overlapping thereon is formed with a position setting hole for leading the holder member to place to a correct position, thereby requiring no separate jig.

5 Claims, 4 Drawing Sheets

ELECTRIC MOTOR HAVING A ROTOR SUPPORTED BY A HOLDER MEMBER WHICH IS ANGULARLY FIXED TO A PRINTED CIRCUIT BOARD

BACKGROUND OF THE INVENTION

1. Field of the Invention

The present invention relates to a holder member fixing apparatus of a motor, and more particularly to holder member fixing apparatus of a motor for enhancing assembling efficiency by maintaining a fixing position constantly without using a separate jig when a holder member rotatably supporting a rotor is fixedly installed to the upper portion of a substrate.

2. Description of the Prior Art

Generally, as shown in FIG. 1, a motor is formed by a separated stator 3 and rotor 4. Stator 3 includes a core 5 laminated in a disc form, and a coil 5a wound around the outer periphery of core 5. Stator 3 is fixedly installed on a printed circuit board 2 formed on the upper portion of a substrate 1. That is, after being seated onto the outer periphery of a holder member 3a upwardly installed on the center of printed circuit board 2, core 5 is fixed to the upper portion of substrate 1 by means of a screw 3b. Also, rotor 4 is equipped with a cap-shaped case 6a which encloses the upper portion of core 5, and a ring-like magnetic body 6 is fixedly installed to the inner periphery of case 6a. Here, magnetic body 6 is alternately provided with n poles and s poles, and a rotating shaft 6b in the center of case 6a is rotatably coupled to holder member 3a.

In the conventional motor constructed as above, when current is applied to coil 5a via printed circuit board 2, a magnetic force is produced on magnetic body 6, and case 6a forming rotor 4 is rotated about rotating shaft 6b. At this time, rotating shaft 6b is rotatably supported by holder member 3a to maintain the rotating accuracy of case 6a.

In the conventional motor, however, handling of holder member 3a is fastidious because a lubricating oil is used for holder member 3a to decrease friction with rotating shaft 6b. That is, holder member 3a which is to be fixed to the upper surface of printed circuit board 2 becomes slippery which makes it difficult to set its fixing position accurately. If the fixing position is inaccurate due to this fact, the position of core 5 on the upper portion of holder member 3a becomes erroneous every product. What's worse, the relative position of a hole device formed on the upper surface of printed circuit board 2 and core 5 is varied. In other words, when the hole device is hidden by core 5, the hole device cannot sense the exact position of magnetic body 6 and a problem of degrading motor performance is obtained. Accordingly, a separate jig is employed to arrange the assembling position of holder member 3a. This lowers workability while the assembling position differs in accordance with the skillfulness of a worker to thereby have a drawback of lowering the performance of the product.

FIG. 2 is a sectional view showing another example of the conventional holder member fixing apparatus, in which a hole 7a is formed in the of printed circuit board 2, and a projection 7 is formed at the lower portion of holder member 3a. Then, by inserting projection 7 into hole 7a, the fixing position is set. But there is a problem of gripping holder member 3a when fixing it while holder member 3a is inserted into hole 7a to prevent it from movably rotating.

FIG. 3 is a sectional view showing still another example of the conventional holder member fixing apparatus, in which a hole 8a is formed in the printed circuit board 2, and a projection 8 protrudes from the of substrate, and is inserted into hole 8a. After projection 8 is inserted into hole 8a, holder member 3a is fixed to the upper surface of projection 8. In this example, however, holder member 3a is free when being placed onto the upper surface of projection 8 which makes assembly difficult to necessitates a separate jig.

SUMMARY OF THE INVENTION

The present invention is devised to solve the foregoing conventional problems. Therefore, it is an object of the present invention to provide a holder member fixing apparatus of a motor, wherein the holder member is fixed to the upper portion of a substrate via a printed circuit board and a position setting hole for setting the fixing position of the holder member is formed in the printed circuit board to facilitate the fixing of the holder member without requiring a separate jig.

To achieve the above object of the present invention, a holder member fixing apparatus of a motor includes a holder member receiving a rotating shaft in the center thereof and formed with a backing stand for placing a rotor thereon at the lower portion of the outer periphery thereof. Also, a substrate has a plurality of couplers to the upper portion thereof to be fixedly coupled by being inserted with a plurality of brackets radially-formed along the outer periphery of the backing stand, and a printed circuit board which is fixedly installed to the upper portion of the substrate while overlapping thereon is formed with a position setting hole for locating the holder member in a correct position, so that there is no need to require a separate jig.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
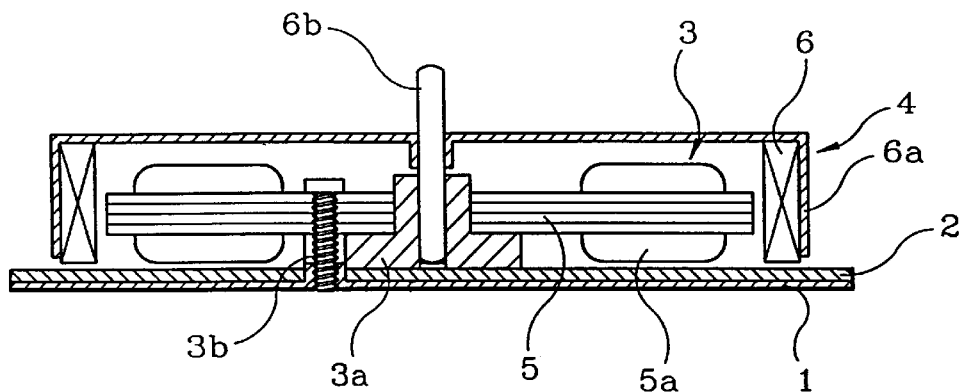
FIG. 1 is a sectional view showing a conventional motor.
Figure 2:
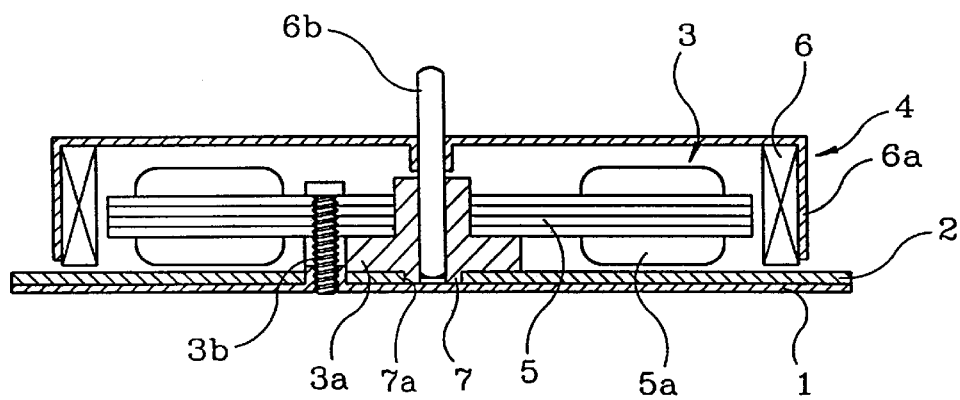
FIG. 2 is a sectional view showing another example of the conventional motor.
Figure 3:
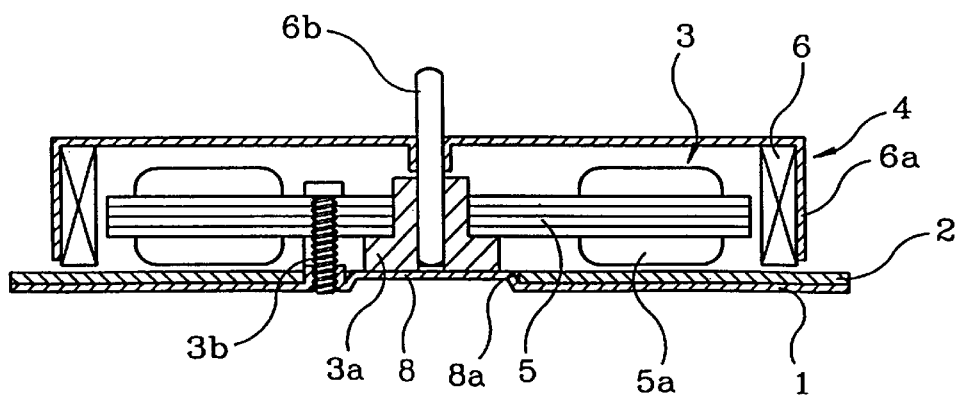
FIG. 3 is a sectional view showing still another example of the conventional motor.
Figure 4:
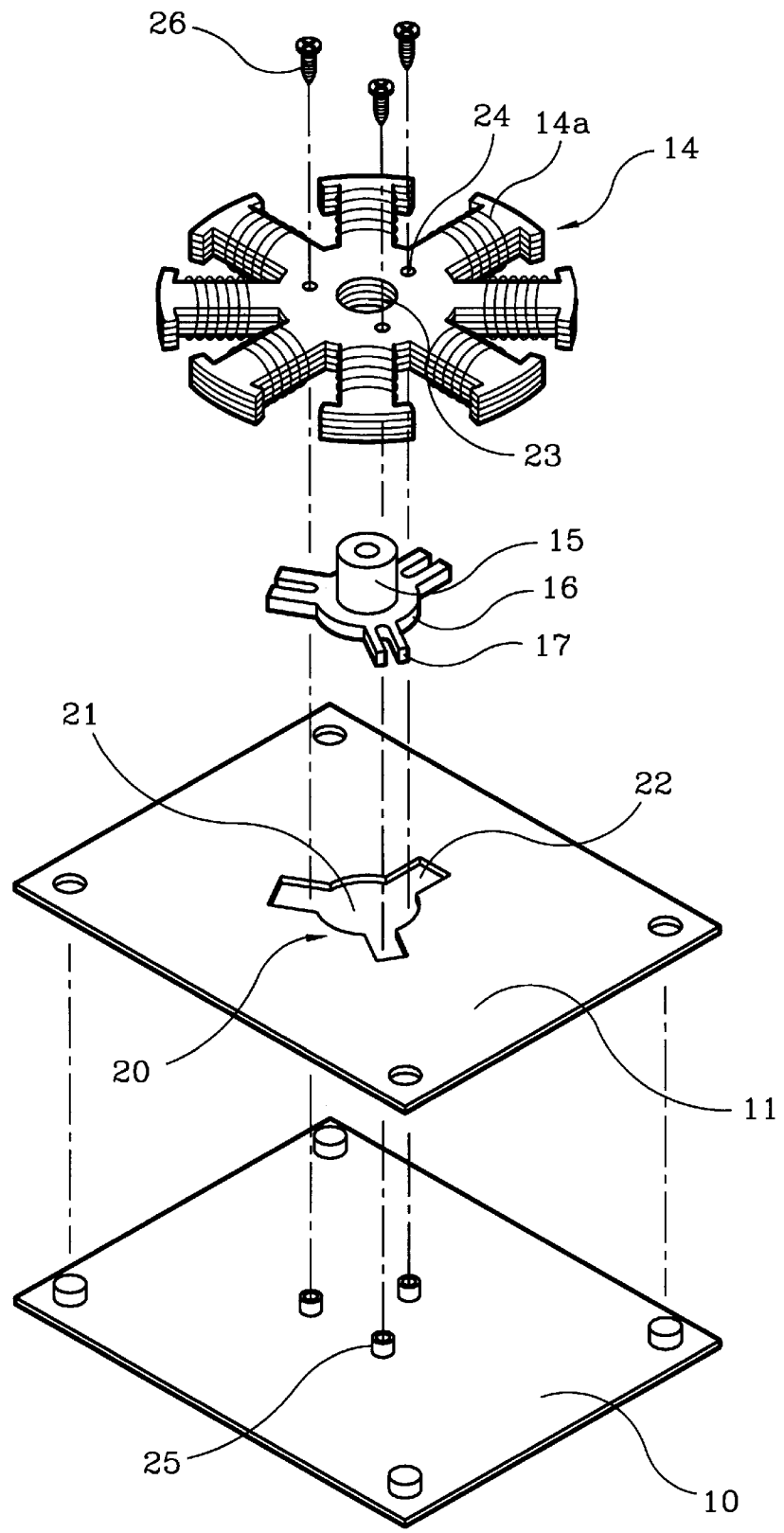
FIG. 4 is an exploded view in perspective of a holder member fixing apparatus according to one embodiment of the present invention.

FIG. 4 is an exploded view in perspective of a holder member fixing apparatus according to the present invention. Here, a hole 23, receiving the upper portion of a holder member 15 is formed in the center of a core 14 wound with several coils 14a on radial arms and a plurality of screw holes 24 are formed around hole 23. A backing stand 16 for supporting core 14 is formed at the lower portion of holder member 15, and a plurality of brackets 17 are formed at the outer periphery of backing stand 16 in the radial direction.

Respective brackets 17 correspond to screw holes 24, and screws 26 penetrate through screw holes 24 and slotted apertures in brackets 17.

A position setting hole 20 is provided in a printed circuit board 11 for setting the assembling position of holder member 15. Position setting hole 20 for holding holder member 15 acts to prevent holder member 15 from turning from the assembling position thereof. Thus, a stand hole portion 21 for receiving backing stand 16 is formed in printed circuit board 11, and radial groove portions 22 for receiving respective brackets 17 extend from to the outer periphery of stand hole portion 21. Couplers 25 projecting from the upper portion of a substrate 10 project upwardly in the corresponding groove portions 22, and screws 26 are engaged in the slotted apertures corresponding couplers 25 via screw holes 24 and the slotted apertures brackets 17.

Figure 5:
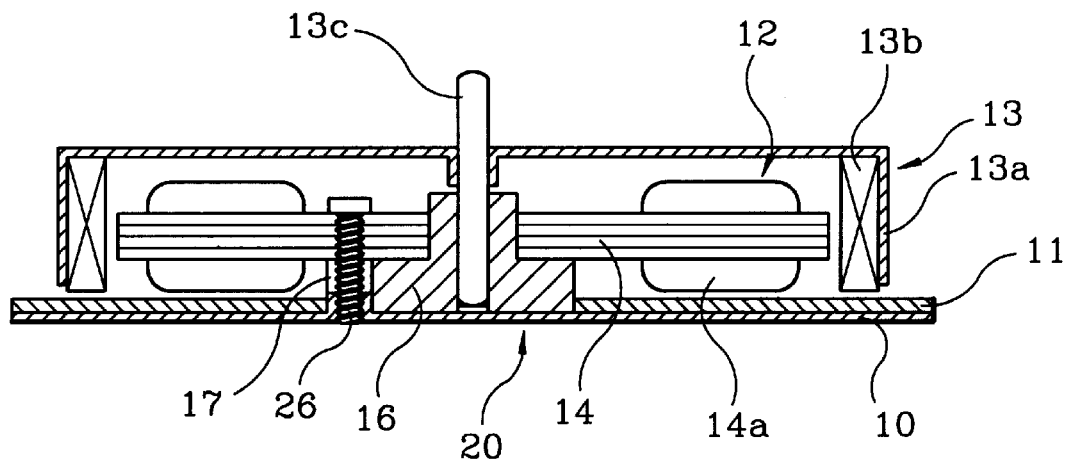
FIG. 5 is a sectional view showing a motor according to one embodiment of the present invention.
Figure 7:
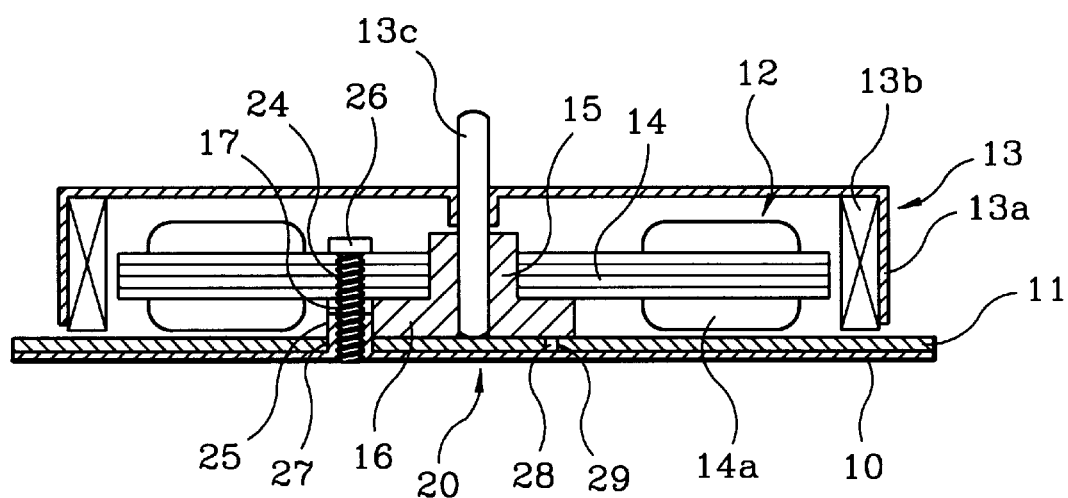
FIG. 7 is a sectional view showing the motor according to another embodiment of the present invention.

FIG. 5 is a sectional view showing a motor according to the present invention, in which printed circuit board 11 is fixedly placed onto the upper portion of rectangular substrate 10, and a stator 12 and a rotor 13 are respectively installed on the upper portion of printed circuit board 11. Stator 12 is provided with core 14 wound with coils 14a, and core 14 is fixed onto the upper surface of substrate 10 by means of screws 26. Rotor 13 is furnished with a case 13a installed to the outer periphery of core 14 to cover the core, and a magnetic body 13b magnetized by multiple n and s poles is installed on the inner periphery of case 13a to develop a magnetic force by means of coils 14a. A rotating shaft 13c is inserted into holder member 15 coupled to the upper surface of substrate 10 by means of screws 26 to guide the rotation, and the center of case 13a is joined to the upper and outer periphery of rotating shaft 13c, thereby being rotated when the magnetic force is produced.

In the motor according to the present invention constructed as above, printed circuit board 11 is fixedly disposed on the upper surface of substrate 10. At this time, the plurality of groove portions 22 respectively extending from the outer periphery of stand hole portion 21 in the radial direction are placed on corresponding couplers 25. Thereafter, by inserting backing stand 16 underlying holder member 15 into stand hole portion 21, the plurality of brackets 17 are inserted into corresponding groove portions 22 to restrain the holder member 15. Once hole 23 of core 14 is fitted into holder member 15 to be placed on backing stand 16, screw holes 24, brackets 17 and couplers 25 are aligned and connected together by means of screws 26.

In the motor according to the present invention assembled as above, backing stand 16 under holder member 15 is fitted into stand hole portion 21 formed in printed circuit board 11 and radially-extending brackets 17 are fitted into corresponding groove portions 22. By doing so, right and left rotation of holder member 15 is prevented. Then, core 14 is placed on the upper portion of holder member 15 by using hole 23, and core 14 and holder member 15 are joined to the upper portion of substrate 10 by means of screws 26 to complete the assembling of the motor. During the assembling, respective brackets 17 are fitted into corresponding groove portions 22 to prevent the assembling position from being varied.

Figure 6:
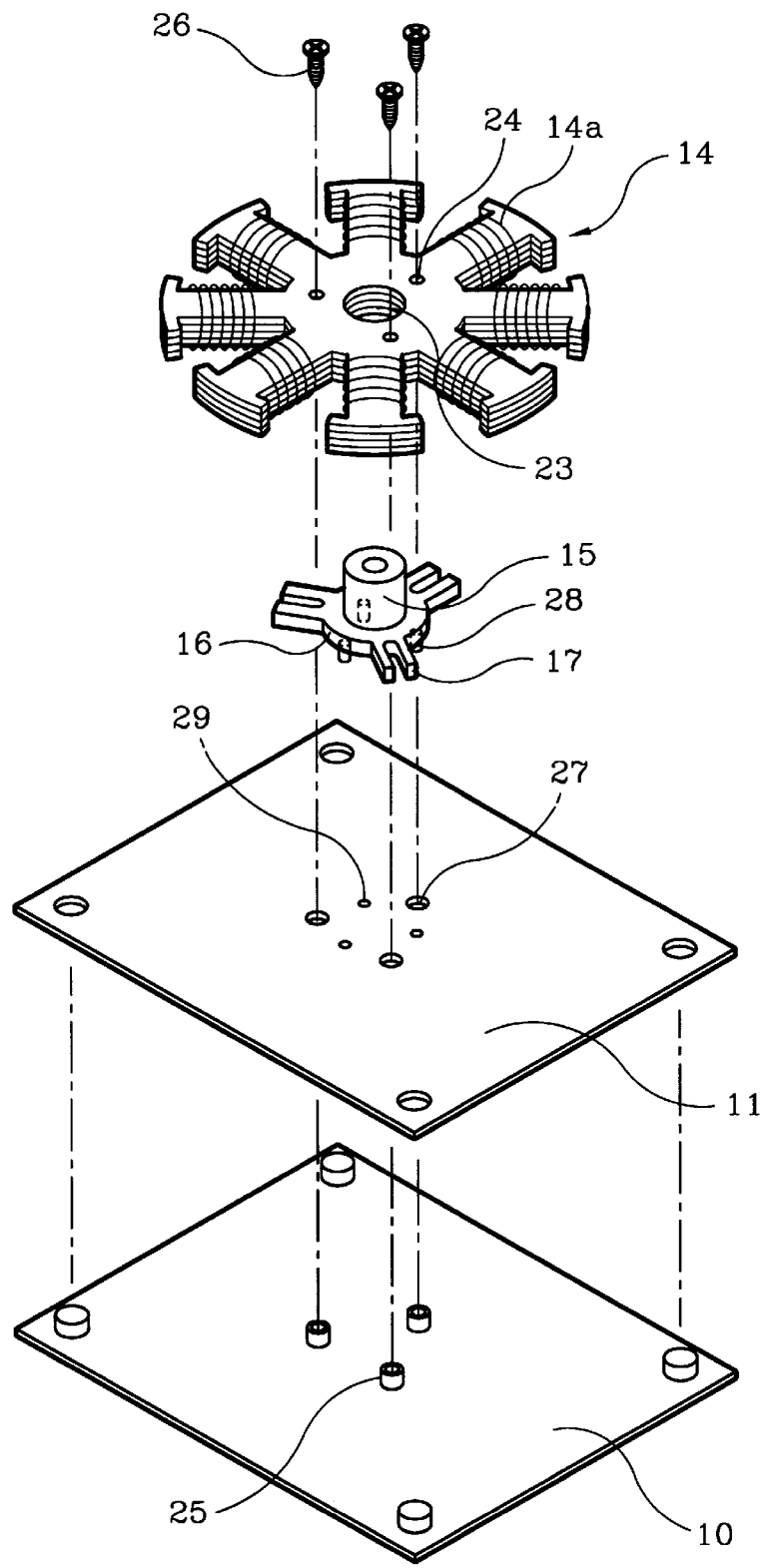
FIG. 6 is an exploded view in perspective of the holder member fixing apparatus according to another embodiment of the present invention.

FIG. 6 is an exploded view in perspective of the holder member fixing apparatus according to another embodiment of the present invention. Here, like parts as shown in FIGS. 4 and 5 are designated by the same reference numerals. Backing stand 16 for placement of core 14 thereon is formed at the lower portion of holder member 15, and brackets 17 extend radially at the outer periphery of backing stand 16. A plurality of pins 28 project from the bottom surface of backing stand 16, and pin holes 29 formed in printed circuit board 11 receive respective pins 28. Substrate 10 is formed with couplers 25 corresponding to respective brackets 17, and fitting holes 27 for receiving respective couplers 25 are formed in printed circuit board 11. When respective pins 28 are inserted into corresponding pin holes 29, respective brackets 17 coincide with corresponding couplers 25.

In the aforementioned embodiment of the present invention having the above construction, by placing printed circuit board 11 onto the upper surface of substrate 10, respective couplers 25 are inserted into holes 27 to be exposed at the upper surface of printed circuit board 11. Thereafter, when holder member 15 is disposed on the upper surface of printed circuit board 11, respective pins 28 are inserted into corresponding pin holes 29, thereby blocking rotation of holder member 15. When respective pins 28 are inserted into corresponding pin holes 29, brackets 15 receive couplers 25. Then, screws 26 are engaged with couplers 25 via screw holes 24 to accurately fix core 14 and holder member 15 at the desired position onto printed circuit board 11.

In the holder member fixing apparatus of the motor according to the present invention as described above, the stand hole fitted with the backing stand underlying the holder member is formed in the printed circuit board fixed to the upper portion of the substrate to support the lower surface of the holder member. Furthermore, the plurality of position fixing grooves are formed along the outer periphery of the stand hole for receiving the plurality of brackets radially on the outer periphery of the backing stand, so that the fixing position of the holder member is not inadvertently changed once the brackets are inserted into the corresponding position fixing grooves. Therefore, when the core placed onto the upper portion of the holder member is coupled to the substrate by means of the screws, there is no need to grip the holder member by using a separate jig and so on, thereby being effective in enhancing assemblage. In addition, according to the embodiment of FIG. 6 of the present invention, the pins formed onto the lower surface of the holder member are fitted into the position setting holes formed in the printed circuit board to automatically set the fixing position of the holder member, thereby simplifying the structure.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An electric motor comprising:
   a rotor having a rotor shaft,
   a stator,
   a holder member rotatably supporting said rotor shaft, said holder member including a backing stand and a plurality of brackets extending radially outwards from said backing stand, said brackets being provided with apertures therein,
   a substrate having a plurality of coupling members engageable in the apertures in said brackets,
   a printed circuit board superimposed on said substrate, said printed circuit board having a position setting hole means for engaging said backing stand of said holder member to angularly secure said holder member in a fixed relative angular position with respect to said printed circuit board, and fastener means for securing said stator to said coupling members on said substrate with said holder member in said fixed angular position with respect to said printed circuit board, said substrate being flat and imperforate beneath said position setting hole means in said printed circuit board.

2. A motor as claimed in claim 1, wherein said position setting hole means in said printed circuit board includes a center hole and a plurality of radial grooves extending from said center hole, said backing stand being positioned in said center hole with said radially extending brackets being positioned in said radial grooves.

3. A motor as claimed in claim 1, wherein said backing stand includes a plurality of pins projecting downwardly from a lower surface of said backing stand, said position setting hole means in said printed circuit board comprising a plurality of pin holes receiving said pins and a plurality of fitting holes receiving said coupling members in position to extend in said apertures in said brackets.

4. A motor as claimed in claim 1, wherein said holder member includes a cylindrical portion, said backing stand being at a lower surface of said cylindrical portion, said stator having a hole in which said cylindrical portion is fitted.

5. A motor as claimed in claim 4, wherein said stator has a plurality of fixing holes surrounding said hole in which said cylindrical portion of the holder member is fitted, said plurality of fixing holes receiving said fastener means.

\* \* \* \* \*